US008489106B2

(12) United States Patent
Zhou

(10) Patent No.: US 8,489,106 B2
(45) Date of Patent: Jul. 16, 2013

(54) METHOD AND SYSTEM FOR PROVIDING QUALITY OF SERVICE ASSURANCE IN WIRELESS COMMUNICATION SYSTEM

(75) Inventor: Yan Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 780 days.

(21) Appl. No.: 11/947,511

(22) Filed: Nov. 29, 2007

(65) Prior Publication Data
US 2008/0076441 A1    Mar. 27, 2008

Related U.S. Application Data

(63) Continuation of application No. PCT/CN2006/001179, filed on Jun. 1, 2006.

(30) Foreign Application Priority Data

Jun. 1, 2005    (CN) .......................... 2005 1 0075625

(51) Int. Cl.
*H04W 72/00*    (2009.01)
(52) U.S. Cl.
USPC ................................... 455/452.2; 455/435.1
(58) Field of Classification Search
USPC ..... 455/452.1–452.2, 432.1–435.3, 436–450; 370/328–338
See application file for complete search history.

(56) References Cited

U.S. PATENT DOCUMENTS

| | | | |
|---|---|---|---|
| 5,794,149 A * | 8/1998 | Hoo | 455/438 |
| 6,725,040 B2 * | 4/2004 | Jiang | 455/436 |
| 6,993,332 B2 | 1/2006 | Pedersen et al. | |
| 2002/0068545 A1 * | 6/2002 | Oyama et al. | 455/406 |
| 2004/0067754 A1 * | 4/2004 | Gao et al. | 455/442 |

(Continued)

FOREIGN PATENT DOCUMENTS

| CN | 1369161 A | 9/2002 |
|---|---|---|
| CN | 1545816 A | 11/2004 |

(Continued)

OTHER PUBLICATIONS

Agrawal et al., "Serving Radio Network Controller Relocation for UMTS All-IP Network," *IEEE Journal on Selected Areas in Communications*, 22(4): 617-629 (May 1, 2004).

(Continued)

*Primary Examiner* — Kashif Siddiqui
(74) *Attorney, Agent, or Firm* — Leydig, Voit & Mayer, Ltd.

(57) ABSTRACT

The present invention relates to a method and a system for providing a quality of service assurance in a wireless communication. The method primarily includes: defining lossless relocation indication information in a WiMax system, transferring the lossless relocation indication information between entities of the WiMax, and providing a quality of service assurance to a corresponding service flow according to the transferred lossless relocation indication information. The present invention also defines end to end MSS-ASN-CSN QoS parameters for WiMax, so that the WiMax may selectively carry out lossless relocation, thereby providing more appropriate QoS parameters for the WiMax system and improving the performance of the wireless communication system. The present invention also defines end to end MSS-ASN-CSN QoS negotiation procedures for WiMax, so that the QoS over the whole end to end MSS-ASN-CSN bearer may be assured for the WiMax, thereby providing differentiated services for WiMax users.

8 Claims, 3 Drawing Sheets

U.S. PATENT DOCUMENTS

| | | | |
|---|---|---|---|
| 2004/0160922 A1* | 8/2004 | Nanda et al. | 370/335 |
| 2004/0203777 A1* | 10/2004 | Watanabe et al. | 455/435.2 |
| 2005/0025181 A1* | 2/2005 | Nazari | 370/469 |
| 2005/0059396 A1* | 3/2005 | Chuah et al. | 455/435.1 |
| 2005/0277421 A1* | 12/2005 | Ng | 455/445 |
| 2005/0286470 A1* | 12/2005 | Asthana et al. | 370/331 |
| 2006/0052107 A1 | 3/2006 | Isobe et al. | |
| 2006/0114855 A1* | 6/2006 | Zheng | 370/331 |
| 2006/0135172 A1 | 6/2006 | Dronne et al. | |
| 2007/0171867 A1 | 7/2007 | Kim | |
| 2009/0075654 A1* | 3/2009 | Lu et al. | 455/435.2 |

FOREIGN PATENT DOCUMENTS

| | | |
|---|---|---|
| CN | 1615614 A | 5/2005 |
| CN | 1615617 A | 5/2005 |
| CN | 100571061 C | 12/2009 |
| EP | 1 633 085 A2 | 3/2006 |
| JP | 2003319430 A | 11/2003 |
| WO | WO 03/105516 A1 | 12/2003 |
| WO | WO 2004/102848 A2 | 11/2004 |
| WO | WO 2005/029787 A1 | 3/2005 |

OTHER PUBLICATIONS

"Universal Mobile Telecommunications System (UMTS); Quality of Service (QoS) Concept and Architecture (3GPP TS 23.107 version 6.2.0 Release 6)," *ETSI Standards*, 3-SA2(V6.2.0): 1-42 (Dec. 1, 2004).

"Universal Mobile Telecommunications System (UMTS); Radio Resource Control (RRC) Protocol Specification (3GPP TS 25.331 Version 6.5.0 Release 6)," *ETSI Standards*, 3-R2(V6.5.0): 1-1028 (Mar. 1, 2005).

Notice of Decision for Final Rejection in counterpart Korean Application No. 10-2007-7030191, mailed Aug. 27, 2010.

Notice of Office Action in counterpart Korean Application No. 10-2007-7030191, mailed Sep. 30, 2009.

Notice of Reasons for Rejection in counterpart Japanese Application No. 2008-513902, mailed Jun. 29, 2010.

Written Opinion in counterpart PCT Application No. PCT/CN2006/001179, mailed Sep. 7, 2006.

Communication in counterpart European Application No. 06 742 066.1-1525, mailed Jul. 28, 2009.

Communication in counterpart European Application No. 06 742 066.1-1525, mailed Apr. 28, 2010.

"WiMAX End-to-End Network Systems Architecture—Stage 2: Architecture Tenets, Reference Model and Reference Points," *WiMAX*, NWG Stage 2 Specification, Apr. 20, 2005.

$1^{st}$ Office Action in corresponding Indian Application No. 2112/MUMNP/2007 (Feb. 21, 2011).

Decision of Rejection in corresponding Japanese Application No. 2008-513902 (Jan. 4, 2011).

International Search Report in corresponding PCT Application No. PCT/CN2006/001179 (Sep. 7, 2006).

$1^{st}$ Office Action in corresponding Canadian Application No. 2,610,444 (Nov. 21, 2011).

Final Rejection in corresponding Korean Application No. 10-2007-7030191 (Aug. 27, 2010).

$2^{nd}$ Office Action in corresponding Indian Application No. 21 12/MUMNP/2007 (Sep. 9, 2011).

Rejection Decision in corresponding Japanese Application No. 2011-053167 (Jan. 10, 2012).

$2^{nd}$ Office Action in corresponding Canadian Patent Application No. 2,610,444 (Oct. 12, 2012).

* cited by examiner

US 8,489,106 B2

METHOD AND SYSTEM FOR PROVIDING QUALITY OF SERVICE ASSURANCE IN WIRELESS COMMUNICATION SYSTEM

CROSS-REFERENCE TO RELATED APPLICATIONS

The present application is a continuation of PCT Application No. PCT/CN2006/001179, filed on Jun. 1, 2006 and entitled "Method and System for Providing Service Quality Ensurence in Wireless Communication System", which claims a priority to Chinese Patent Application No. 200510075625.5, filed on Jun. 1, 2005 and entitled "Method for Providing Quality of Service Assurance in Wireless Communication System". All of these applications are incorporated herein by reference for all purposes.

FIELD OF THE INVENTION

The present invention relates to the field of wireless communication technologies, and more particularly to a method and a system for providing a Quality of Service (QoS) assurance in a wireless communication system.

BACKGROUND OF THE INVENTION

In an existing wireless communication system, such as Wideband Code Division Multiple Access (WCDMA) system and Code Division Multiple Access (CDMA) system, it is often necessary to provide different quality of service assurances for different users or for individual service flows of the user so as to provide differentiated services to users.

With the development of wireless communication technologies, the World Interoperability for Microwave Access (WiMax) system is becoming a new wireless broadband access technology drawing great attention in wireless communication systems. The WiMax system primarily includes an Access Service Network (ASN), a Connectivity Service Network (CSN) and a Mobile Subscriber Station (MSS). The ASN is a set of network functions that provide radio access to a WiMax subscriber. The ASN includes network elements such as Base Station (BS) and ASN GateWay (ASN GW). One ASN may be shared by multiple CSNs. The CSN is configured to provide Internet Protocol (IP) connectivity services to WiMax subscribers. The CSN may include an Authentication Authorization Accounting Server (AAA Server) function.

The same as in the WCDMA system and the CDMA system, in the WiMax system, it is necessary to provide the users with respective QoS assurances. In the existing WiMax system, only part of air interface information is defined while end-to-end QoS parameters and processes over the whole WiMax access network have not yet been defined. In other words, there is no QoS parameter defined for WiMax and no corresponding processing procedure is provided.

Therefore, it is impossible to provide different QoS assurances for different users in the existing WiMax system, i.e. it is impossible to provide different levels of QoS for users or for individual service flows of the user.

SUMMARY OF THE INVENTION

The present invention provides a method and a system for providing a quality of service assurance in a wireless communication system, so as to provide different quality of service assurances for different users or for individual service flows of the user.

The present invention provides a method for providing a quality of service assurance in a wireless communication system. The method includes:

defining, in the wireless communication system, a quality of service parameter indicating relocation performance;

negotiating, between entities in the wireless communication system, quality of service parameters including the quality of service parameter indicating relocation performance; and providing a quality of service assurance corresponding to the negotiated quality of service parameters to a corresponding service flow.

The procedure for defining the quality of service parameter includes:

defining lossless relocation indication information as the quality of service parameter in the wireless communication system.

The present invention also provides a method for providing a quality of service assurance in a wireless communication system. The method includes:

defining lossless relocation indication information in the wireless communication system;

transferring the lossless relocation indication information between entities in the wireless communication system; and providing a lossless or at least higher level of quality of service assurance to a specified service flow according to the transferred lossless relocation indication information.

The procedure for defining the quality of service parameter includes:

defining the lossless relocation indication information as a quality of service parameter in the wireless communication system.

The wireless communication system has a lossless relocation processing procedure and includes at least a World Interoperability for Microwave Access (WiMax) system, a Wideband Code Division Multiple Access (WCDMA) system, a Code Division Multiple Access (CDMA) system, a CDMA-2000 system and a Time Division-Synchronous Code Division Multiple Access (TD-SCDMA) system.

In the WiMax system, the lossless relocation indication information includes:

an indicator indicating whether to perform an Intra Access Service Network (ASN) lossless relocation, an indicator indicating whether to perform an Inter ASN lossless relocation, an indicator indicating whether to perform an Intra ASN cross-operator lossless relocation, an indicator indicating whether to perform an Inter ASN cross-operator lossless relocation and an parameter for indicating assurance target or assurance level of a lossless relocation.

The present invention also provides a method for providing a quality of service assurance in a wireless communication system. The method includes:

defining in the wireless communication system quality of service parameters including quality of service parameters presenting requirements on air interface and quality of service parameters presenting information of upper-layer services;

wherein the quality of service parameters presenting information of upper-layer services include at least one of Traffic class, User priority for traffic, Service Data Unit error ratio, Residual bit error ratio or Delivery of erroneous Service Data Units; negotiating the quality of service parameters between entities in the wireless communication system; and providing a quality of service assurance corresponding to the negotiated quality of service parameters.

In a WiMax system, if an access service network gateway is responsible for controlling quality of service negotiation, the negotiation procedure includes:

sending, by a mobile subscriber station, a request for setting up a service to the access service network gateway, with quality of service parameters carried in the request;

checking, by the access service network gateway, the quality of service parameters for the service flow according to subscribed quality of service parameters; and under the control of the access service network gateway, negotiating and setting up a corresponding service transferring tunnel between a serving base station of the mobile subscriber station and a connectivity service network on the basis of the quality of service parameters.

The procedure for setting up the service transferring tunnel includes:

setting up, by the access service network gateway, a corresponding radio bearer through exchanging information with the serving base station of the mobile subscriber station according to the quality of service parameters of the mobile subscriber station; and setting up, by the access service network gateway, a corresponding tunnel through exchanging information with the connectivity service network according to the quality of service parameters of the mobile subscriber station.

The procedure for providing the quality of service assurance includes:

after setting up the corresponding service transferring tunnel, returning, by the access service network gateway, a response message to the mobile subscriber station, with the negotiated quality of service parameters carried in the response message; and starting, by the mobile subscriber station, a corresponding service based on the service transferring tunnel.

In a WiMax system, if an access service network gateway is responsible for obtaining subscription data and a serving base station is responsible for controlling quality of service negotiation, the procedure for negotiating includes:

obtaining, by the access service network gateway, subscribed quality of service parameters of a mobile subscriber station from a procedure initiated by the mobile subscriber station for connecting to a network;

sending, by the access service network gateway, the subscribed quality of service parameters to a serving base station;

sending, by the mobile subscriber station, to the serving base station a request for setting up a service, with quality of service parameter information carried in the request;

checking and determining, by the serving base station, quality of service parameters for the service flow according to the subscribed quality of service parameters and the quality of service parameter information; and negotiating, by the serving base station of the mobile subscriber station, with the connectivity service network and setting up, by the serving base station of the mobile subscriber station, a corresponding service transferring tunnel to the connectivity service network according to the checked quality of service parameters.

The procedure for negotiating further includes:

when a handover or location update of the mobile subscriber station occurs, sending, by the access service network gateway, the quality of service parameter information to a new serving base station of the mobile subscriber station.

The procedure for providing the quality of service assurance includes:

after setting up the corresponding service transferring tunnel, returning, by the serving base station, a response message to the mobile subscriber station, with the negotiated quality of service parameter information of the mobile subscriber station carried in the response message; and starting, by the mobile subscriber station, the corresponding service based on the service transferring tunnel.

In a WiMax system, if a serving base station is responsible for obtaining subscription data and controlling quality of service negotiation, the procedure for negotiating includes:

obtaining, by the serving base station, subscribed quality of service parameters of a mobile subscriber station from a procedure initiated by the mobile subscriber station for connecting to a network;

sending, by the mobile subscriber station, to the serving base station a request for setting up a service, with quality of service parameter information carried in the request;

checking and determining, by the serving base station, quality of service parameters for the service flow according to the subscribed quality of service parameters and the quality of service parameter information; and negotiating, by the serving base station of the mobile subscriber station, with the connectivity service network and setting up, by the serving base station of the mobile subscriber station, a corresponding service transferring tunnel to the connectivity service network, according to the checked quality of service parameters.

The procedure for providing the quality of service assurance includes:

after setting up the corresponding service transferring tunnel, returning, by the serving base station, a response message to the mobile subscriber station, with the negotiated quality of service parameter information of the mobile subscriber station carried in the response message; and starting, by the mobile subscriber station, the corresponding service based on the service transferring tunnel.

The present invention also provides a wireless communication system, including entities for implementing quality of service, wherein the network entities for implementing quality of service negotiate with each other quality of service parameters including a relocation performance indicating parameter, and provide a quality of service assurance corresponding to the negotiated quality of service parameters to a corresponding service flow.

The wireless communication system is a World Interoperability for Microwave Access (WiMax) system, a Wideband Code Division Multiple Access (WCDMA) system, a Code Division Multiple Access (CDMA) system, a CDMA-2000 system or a Time Division-Synchronous Code Division Multiple Access (TD-SCDMA) system.

The present invention also provides a World Interoperability for Microwave Access (WiMax) system, and network entities for implementing quality of service in the WiMax system include an access service network gateway, a serving base station and a connectivity service network; and the access service network gateway is configured to check quality of service parameters for a service flow according to quality of service parameter information carried in a request from a mobile subscriber station for setting up the service and control the negotiation and setup of a service transferring tunnel between the serving base station of the mobile subscriber station and the connectivity service network on the basis of the quality of service parameters.

The present invention also provides a World Interoperability for Microwave Access (WiMax) system, wherein network entities for implementing quality of service in the WiMax system includes an access service network gateway, a serving base station and a connectivity service network; and the access service network gateway is configured to check quality of service parameters for a service flow according to subscribed quality of service parameters of a mobile subscriber station, exchange information with the serving base station of the mobile subscriber station according to the quality of service parameters of the mobile subscriber station to set up a corresponding radio bearer and exchange information with the connectivity service network according to the quality of service parameters of the mobile subscriber station to set up a corresponding tunnel.

The present invention also provides a World Interoperability for Microwave Access (WiMax) system, and network entities for implementing quality of service in the WiMax system includes an access service network gateway, a serving base station and a connectivity service network;

the access service network gateway is configured to obtain subscribed QoS parameters of a mobile subscriber station from a procedure initiated by the mobile subscriber station for connecting to a network and send the subscribed quality of service parameters to the serving base station; and the serving base station is configured to check and determine quality of service parameters of the mobile subscriber station for a service flow according to the subscribed quality of service parameters, and negotiate with the connectivity service network and set up a corresponding service transferring tunnel to the connectivity service network according to the checked quality of service parameters.

When a handover or relocation of the mobile subscriber station occurs, the access service network gateway sends the quality of service parameter information to a new serving base station of the mobile subscriber station.

The present invention also provides a World Interoperability for Microwave Access (WiMax) system, and network entities for implementing quality of service in the WiMax system includes a serving base station and a connectivity service network; and the serving base station is configured to obtain subscribed QoS parameters of a mobile subscriber station in a procedure initiated by the mobile subscriber station for connecting to a network, check and determine quality of service parameters of the mobile subscriber station for a service flow according to the subscribed quality of service parameters and the quality of service parameter information, and negotiate with the connectivity service network and set up a corresponding service transferring tunnel to the connectivity service network according to the checked quality of service parameters.

According to the technical solutions provided by the present invention, the present invention defines a quality of service parameter indicating relocation performance, so that the WiMax may selectively carry out lossless relocation. Specifically, the WiMax may determine whether a user subscribes to lossless relocation through collectively considering network complexity, cross-operator subscription, latency and packet loss rate, user class and the like, so as to provide more appropriate QoS parameters to the WiMax system. In addition, the lossless relocation indicator parameter may also be applied to other wireless communication systems such as WCDMA and CDMA system to improve the performance of these wireless communication systems.

The present invention also defines end to end MSS-ASN-CSN QoS negotiation procedures for WiMax, so that the QoS over the whole end to end MSS-ASN-CSN bearer may be assured for the WiMax, thereby providing differentiated services for WiMax users.

DETAILED DESCRIPTION OF THE EMBODIMENTS

Figure 1:
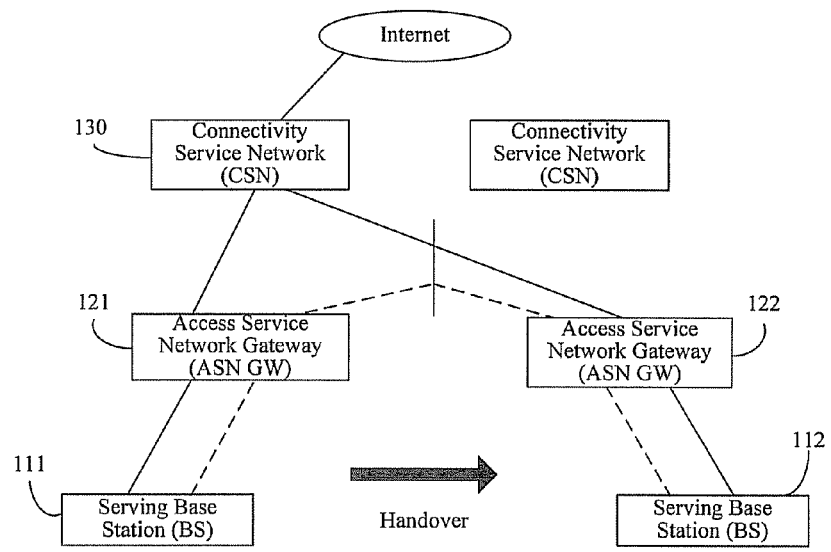
FIG. 1 is a schematic diagram illustrating lossless relocation in a WiMax system according to an embodiment of the present invention.

In the present invention, corresponding QoS parameters may be selectively defined for the properties of the WiMax system. End to end QoS negotiation may be implemented in the WiMax system according to the corresponding QoS parameters. The present invention sets forth QoS parameters and negotiation procedures for WiMax. The defined QoS parameters include some parameters that have not been used in the existing wireless networks. The implementation of the present invention enables an end to end QoS assurance in the WiMax system.

The parameters proposed in the present invention may be used in end to end QoS negotiation for ASN GW, BS, MSS and CSN as well as AAA server.

The WiMax QoS parameters proposed in the present invention are constituted by two parts, i.e. the QoS parameters defined on the basis of 802.16e (wireless access standard) and the QoS parameters specially defined for the present invention. Hereunder these two parts of QoS parameters will be described respectively.

The WiMax QoS parameters defined on the basis of 802.16e (wireless access standard) include Traffic handling priority having a value in a range of 0-7, Maximum Sustained Traffic Rate (kcbps), Maximum Traffic Burst (Byte), Minimum Reserved Traffic Rate (kcbps), Tolerated Jitter, Maximum Latency and Maximum Service Data Unit (SDU) size.

The WiMax QoS parameters specially defined for the present invention include User priority, SDU error ratio, Residual bit error ratio, Delivery of erroneous SDUs, Lossless Relocation indicator and Traffic class. The Traffic class may be conversational, streaming, interactive and background, and may be extended as required. These especially defined WiMax QoS parameters may also be defined in other ways with the same conception.

The WiMax QoS parameters proposed in the present invention will be described hereunder in detail to make the parameters specially defined for the present invention more easily to be understood.

(I) User Priority, i.e. User Differentiated Level

This parameter is used to enable various sections on a WiMax end to end bearer to identify different users. Important users have a high priority. For instance, it is necessary for the logic entities such as, but not limited to, Admission Control entity, Source Distribution entity and QoS Executing (schedule, buffering, and the like) entity to take the user differentiated level into account. Moreover, the User Priority, as a QoS parameter, needs to be sent to ASN GW and especially BS.

This parameter may be presented in 8 bits and have a value in a range of [0, 127]. In this embodiment, this parameter preferably has a value of 1, 2 or 3. This parameter is defined in a way similar to that for defining Allocation/Retention Priority in 3GPP 23.107.

A user may subscribe to multiple services and the QoS Profile of each subscribed service may have different user differentiated levels. For instance, a user A may subscribe to a video service as an important user while subscribe to a conversational service as an ordinary user. Therefore, although the user differentiated level is defined by a user, the User Priorities of the user may be identical or different for all his subscribed services.

In the present invention, the BS is required to, as a QoS Enforcement Point (EP), be directly responsible for the QoS enforcement of air interface and exactly know the user differentiated level. The ASN GW, including Decision Point (DP) and Enforcement Point (EP), is also required to exactly know the user differentiated level when the QoS EP of the ASN GW is applied to the service flow.

It is also set forth in the present invention that a user in WiMax may have the same User Priority or different User Priorities for all services that the user subscribes to.

(II) Lossless Relocation Indicator

The proposal of the lossless relocation indicator in the present invention means that lossless relocation is not necessary in every case, but an optional requirement depending on certain service demands, user levels and network conditions. The relocation or handover performance includes parameters such as whether is lossless under the various conditions, which service flow is lossless, how is lossless under the various conditions, what level of lossless under the various conditions and the like.

Lossless relocation means that when a handover between BSs occurs, the Old BS (the original base station, i.e. the serving base station before the handover) forwards to a New BS downlink data packets that have not yet been delivered, so as to assure the continuity of the downlink data packets. As an example of the principle of lossless relocation applied to the SRNS Relocation procedure in 3GPP, an Old Radio Network Controller (Old RNC) forwards downlink data packets that have not yet been delivered to a Target RNC. In WiMax, lossless relocation means that when a handover between BSs occurs or a BS is changed due to a handover procedure, the Old BS forwards downlink data packets that have not yet been delivered to a New BS (the serving base station after the handover). The principle of lossless relocation may also be used in other procedures in WiMax with a similar conception.

Referring to FIG. 1, when a handover from a serving base station 111 and an access service network gateway 121 to a serving base station 112 and an access service network gateway 122 occurs, the serving base station 111 forwards downlink data packets that have not yet been delivered to the serving base station 112. In this embodiment, the access service network gateway 121 and the access service network gateway 122 connect to the same connectivity service network 130.

For WiMax, the present invention tales whether to support lossless relocation as a QoS parameter, and the present invention proposes that lossless relocation may be used in differentiated services for users. The present invention proposes that the lossless relocation does not make sense or makes little sense relatively in some cases, and that it may be determined whether a user subscribes to lossless relocation through collectively considering network complexity, cross-operator subscription, latency and packet loss rate, user class and the like.

In the implementation of the present invention, the following cases may be taken into account to configure an appropriate lossless relocation indicator.

1. Not all services need lossless relocation. Some services, for which packet loss to a certain level is permitted, may be configured to not need lossless relocation.

2. In some cases such as a real-time video stream, it is not necessary for downlink data packets to wait for data packets forwarded with lossless relocation, because there may be a higher requirement in real-time than that in packet loss rate.

3. In some network conditions, the data packets forwarded with lossless relocation may have a too long latency, resulting in that the data packets become useless when they are forwarded to the target entity.

4. When a cross-operator handover occurs, the operators need to design network security and interoperability on multiple layers so as to assure a lossless relocation, thus making the network designing harder and the networking more complicated.

Thus, the operators need to pay expense, especially in networking and security to implement a lossless relocation. Therefore, in the present invention, lossless relocation is only taken as an approach for presenting user differentiated services and is only performed for important users or users who have a demand on lossless relocation.

In this embodiment, this parameter is presented in 4 bits. In the 4 bits, bit 1 indicates whether to perform an Intra ASN lossless relocation, bit 2 indicates whether to perform an Inter ASN lossless relocation, bit 3 indicates whether to perform an Intra ASN cross-operator lossless relocation, and bit 4 indicates whether to perform an Inter ASN cross-operator lossless relocation. This parameter may also include the service flow to which the lossless relocation corresponds and the sequence number necessary to be transferred for the lossless relocation, or other parameters capable of indicating the assurance target or the assurance level of the lossless relocation.

The present invention is not limited to the parameter define approach as described in this embodiment, and all approaches reflecting whether to perform lossless relocation may be employed.

On the basis of this parameter, the operators may plan the physical connectivity distribution and performance requirement according to the move region and the number of the users subscribing to lossless relocation.

The BS determines whether to start a lossless relocation procedure according to the lossless relocation indicator in the subscribed QoS.

(III) SDU Error Ratio, Residual Bit Error Ratio, Delivery of Erroneous SDUs

In an embodiment of the present invention, reliability parameters are defined for WiMax as QoS parameters, and it is proposed that upper-layer services requires the physical layer and the data link layer to support reliability requirement.

The above three reliability parameters may be defined with reference to that in 3GPP 23.107. In the QoS view, the upper-layer services may have reliability requirement on data packet delivery, so as to ensure the implementation of the services and the quality of service. The data link layer and the physical layer are required to meet this reliability requirement through corresponding mechanisms.

(IV) Traffic Class

In an embodiment of the present invention, the traffic classes are similar to that in 3GPP, which include conversational class, streaming class, interactive class and background class, and may be extended as required.

The WiMax QoS processing procedure will be described hereunder on the basis of the above defined quality of service parameters. The present invention provides three processing procedures according to the entity for obtaining subscription data and the entity for controlling QoS negotiation. These processing procedures may be used separately, and will be described respectively as bellow.

Figure 2:
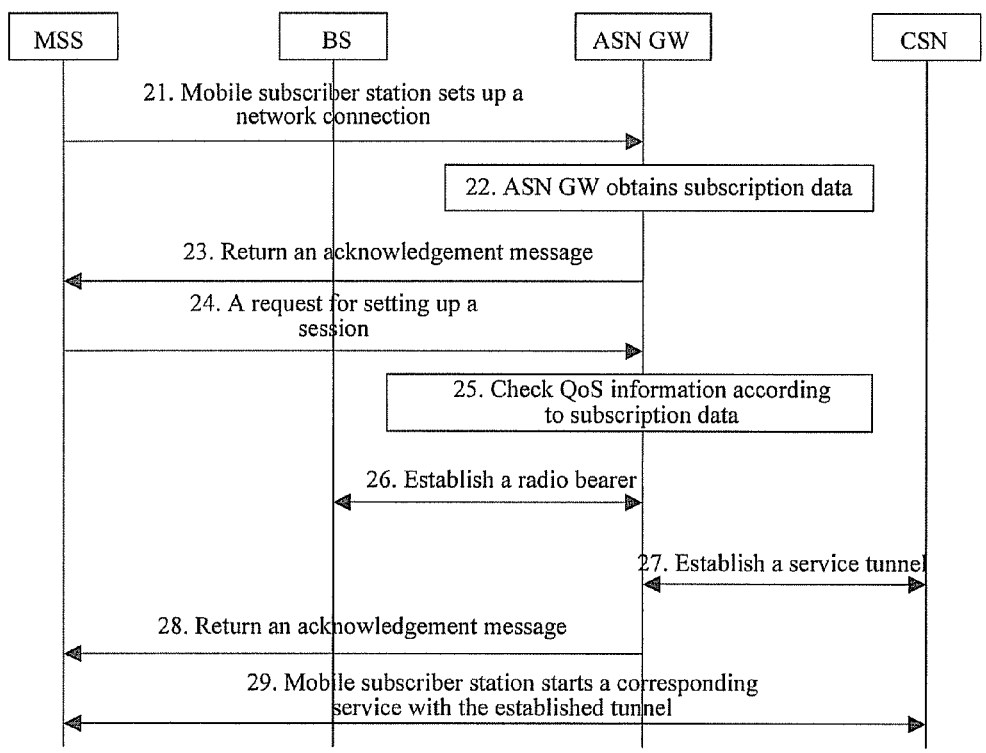
FIG. 2 is a flow chart illustrating the procedure for an ASN GW obtaining subscription data and controlling negotiation of quality of service parameters according to an embodiment of the present invention.

In one processing procedure, the ASN GW obtains subscription data and controls QoS negotiation. In this processing procedure, the BS performs QoS EP but does not perform negotiation controlling DP. As shown in FIG. 2, a specific processing procedure includes the steps as follows.

In step 21, a network connection is set up between the mobile subscriber station (MSS) and the ASN GW.

In step 22, the ASN GW obtains subscription data from an AAA server. The subscription data may be used in QoS negotiation for services.

The subscription data includes a lossless relocation indicator and all the other QoS parameters.

In step 23, the ASN GW returns an acknowledgement message to the mobile subscriber station.

In step 24, the mobile subscriber station sends to the ASN GW a request for setting up a session, with QoS information required for a service carried in the request message.

The QoS information consists of all the previously defined parameters, but it is allowable that a part of the parameters are optional.

In step 25, the ASN GW checks the QoS information in the request message according to the subscription data, and determines QoS parameters that may be provided for the service, including contrasting each of the parameters in the request with the obtained subscription data to determine whether the parameter is permitted by the subscription data.

In step 26, the ASN GW exchanges information with the serving base station (BS) using the determined QoS parameters and sets up a radio bearer for transferring the service.

The information exchanging includes negotiating all the previously defined parameters except that the lossless relocation indicator and the differentiated level parameter are delivered to the serving base station without being negotiated.

In step 27, the ASN GW sets up a tunnel for transferring the service through exchanging information with the CSN according to the determined QoS parameters.

The information exchanging includes negotiating all the previously defined parameters, except that the lossless relocation indicator is useless to the CSN and may not be sent to the CSN and the differentiated level parameter needs to be delivered to the CSN.

In step 28, when the tunnel for transferring the service is set up, the ASN GW returns an acknowledgement message to the mobile subscriber station, with QoS parameters that may be provided to the mobile subscriber station carried in the acknowledgement message.

The QoS parameters consist of all the previously defined parameters, but it is allowable that a part of the parameters are optional.

In step 29, the mobile subscriber station transfers the service with the set up tunnel and starts the service, and provides a corresponding QoS assurance for the service based on the tunnel.

In the processing procedure as shown in FIG. 2, even when a handover or relocation (including Intra ASN GW handover or relocation, and Inter ASN GW handover or relocation) of the mobile subscriber station occurs, the QoS may be created and negotiated by a normal ASN GW-BS service flow bearing procedure or a defined ASN GW-BS service flow bearing procedure similar to the normal bearing procedure.

When executing the handover or relocation procedure, the old BS determines whether to forward to the new BS the downlink packets on the user plane which have not yet been delivered to the mobile subscriber station.

Figure 3:
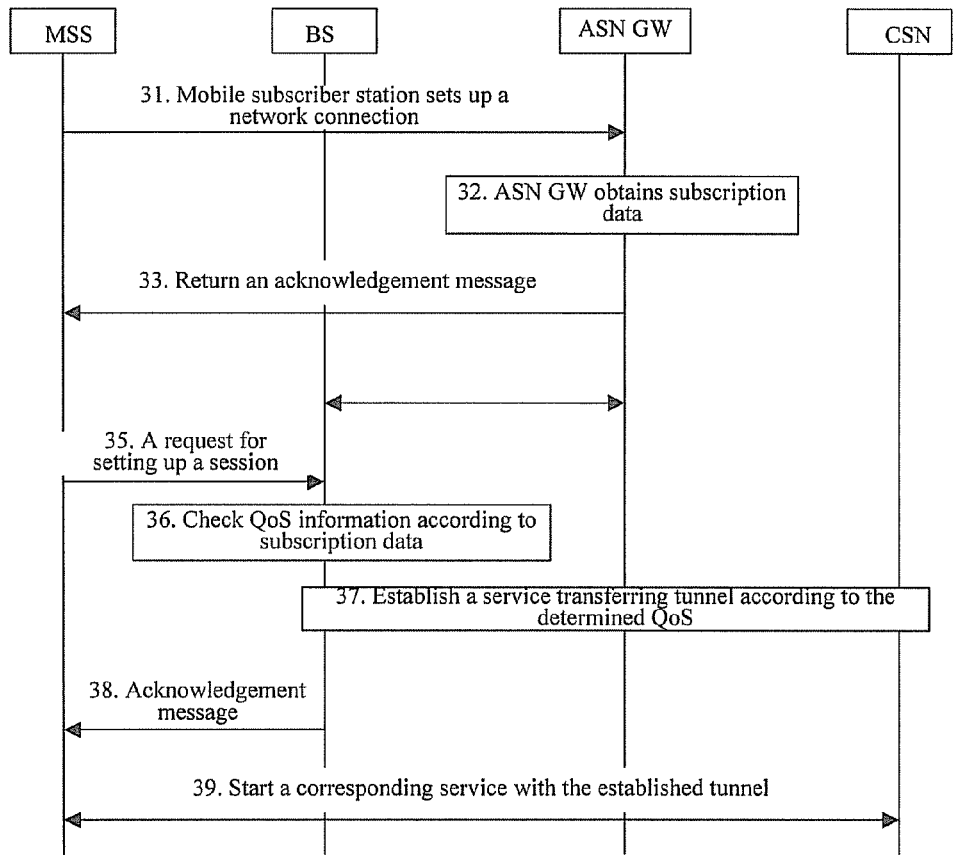
FIG. 3 is a flow chart illustrating the procedure for an ASN GW obtaining subscription data and a BS controlling negotiation of quality of service parameters according to an embodiment of the present invention.

In another processing procedure, the ASN GW obtains the subscription data and the serving base station (BS) of the mobile subscriber station controls the QoS negotiation. In this processing procedure, the BS performs not only the QoS EP but also the negotiation controlling DP. As shown in FIG. 3, a specific processing procedure includes the steps as follows.

In step 31, a network connection is set up between the mobile subscriber station and the ASN GW.

In step 32, the ASN GW obtains subscription data from an AAA server. The subscription data may be used in QoS negotiation for services.

The subscription data includes a lossless relocation indicator and all the other QoS parameters.

In step 33, the ASN GW returns an acknowledgement message to the mobile subscriber station.

In step 34, the ASN GW exchanges the obtained subscription data with the BS. The ASN GW sends the obtained subscription data to the BS so that the BS may perform QoS negotiation according to the subscription data.

In step 35, the mobile subscriber station sends to the BS a request for setting up a session, with QoS information required for a service carried in the request message.

The QoS information consists of all the previously defined parameters, but it is allowable that a part of the parameters are optional.

In step 36, the BS checks the QoS information according to the subscription data, and determines the QoS parameters that may be provided for the service, including contrasting each of the requested parameters with the subscription data obtained in step 32 to determine whether the parameter is permitted by the subscription data and checking the resources locally on BS.

In step 37, the BS initiates negotiation with the ASN GW and the CSN on the basis of the determined QoS parameters, to set up a service transferring tunnel for transferring the service.

The negotiation includes negotiating all the previously defined parameters, except that the lossless relocation indicator is useless to the ASN GW/CSN and may not be sent to the ASN GW/CSN and the differentiated level parameter needs to be delivered to the ASN GW/CSN. The ASN GW may also obtain the differentiated level directly from the subscribed QoS information.

In step 38, when the service transferring tunnel is set up, the BS returns an acknowledgement message to the mobile subscriber station, with QoS parameters that may be provided to the mobile subscriber station carried in the acknowledgement message. The QoS parameters consist of all the previously defined parameters, but it is allowable that a part of the parameters are optional.

In step 39, the mobile subscriber station transfers the service with the set up tunnel and starts the service, and provides a corresponding QoS assurance for the service based on the tunnel.

In the processing procedure as shown in FIG. 3, when a handover or relocation of the mobile subscriber station occurs, the ASN GW is required to send corresponding subscription data to the new serving base station (BS) after the handover or location update of the mobile subscriber station. The corresponding processing procedures are shown in FIG. 4 and FIG. 5 and will be described respectively as below.

Figure 4:
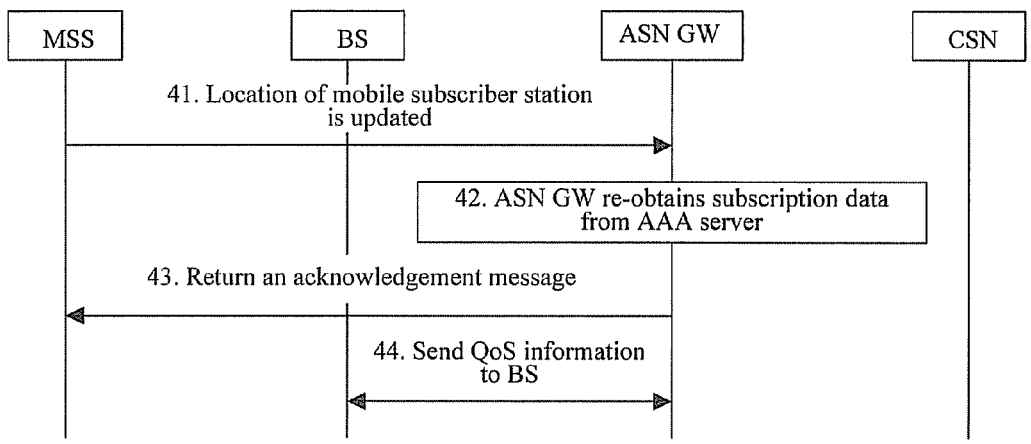
FIG. 4 is a flow chart illustrating the processing performed when the location of the mobile subscriber station in FIG. 3 is updated.
Figure 5:
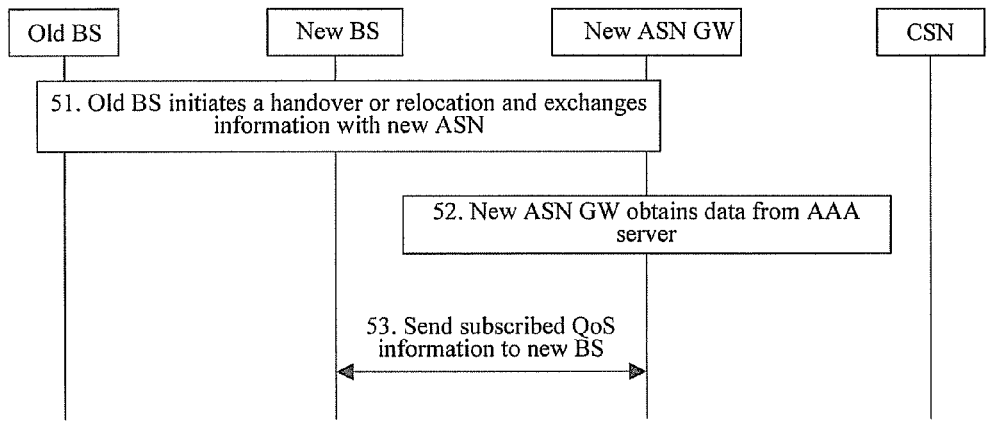
FIG. 5 is a flow chart illustrating the processing performed when a handover of the mobile subscriber station in FIG. 3 occurs.

FIG. 4 shows a specific processing procedure performed when the mobile subscriber station moves and results in an intra-ASN-GW or inter-ASN-GW location update. The processing procedure includes the steps as follows.

In step 41, the mobile subscriber station notifies the ASN GW of the fact that its location is updated to another BS.

In step 42, if the ASN GW maintains unchanged, the procedure proceeds to step 43; otherwise, the ASN GW re-obtains from an AAA server subscription data to be used in QoS negotiation for services.

The subscription data includes a lossless relocation indicator and all the other QoS parameters.

In step 43, the ASN GW returns an acknowledgement message to the mobile subscriber station.

In step 44, the ASN GW exchanges the obtained subscription data with the BS currently serving the mobile subscriber station. The ASN GW sends the obtained subscription data to the BS so that the BS may perform QoS negotiation according to the subscription data.

FIG. 5 shows a processing procedure performed when an intra-ASN-GW or inter-ASN-GW handover occurs. The new ASN GW in FIG. 5 exists only when an inter-ASN-GW relocation occurs, and the new ASN GW is the original ASN GW when the handover or relocation occurs in the same ASN. The procedure in FIG. 5 includes the steps as follows.

In step 51, the BS originally serving the mobile subscriber station notifies the original ASN GW, the new ASN GW and the new BS of the handover of the mobile subscriber station, i.e. of the fact that the mobile subscriber station is handed over to a new BS served by a new ASN GW. The new BS may get, through this process, the QoS parameters used by the mobile subscriber station before the relocation and then allocate its own resources. The QoS parameters consist of all the previously defined parameters.

When executing the handover or relocation procedure, the old BS will determine whether to forward to the new BS the downlink packets on the user plane which have not yet been delivered to the mobile subscriber station.

In step 52, the new ASN GW obtains from an AAA server subscription data to be used in QoS negotiation for services.

The subscription data includes a lossless relocation indicator and all the other QoS parameters.

In step 53, the new ASN GW exchanges the obtained subscription data with the BS currently serving the mobile subscriber station (i.e. the new BS). The new ASN GW sends the obtained subscription data to the new BS so that the new BS may perform subsequent QoS negotiation according to the subscription data.

In subsequent processing by the new BS, if the relocation procedure is initiated, the new BS will determine whether to transfer downlink (data packets on the user plane that have not yet been delivered, according to the lossless relocation indicator. If the new BS determines not to transfer the downlink data, it discards these downlink data.

Figure 6:
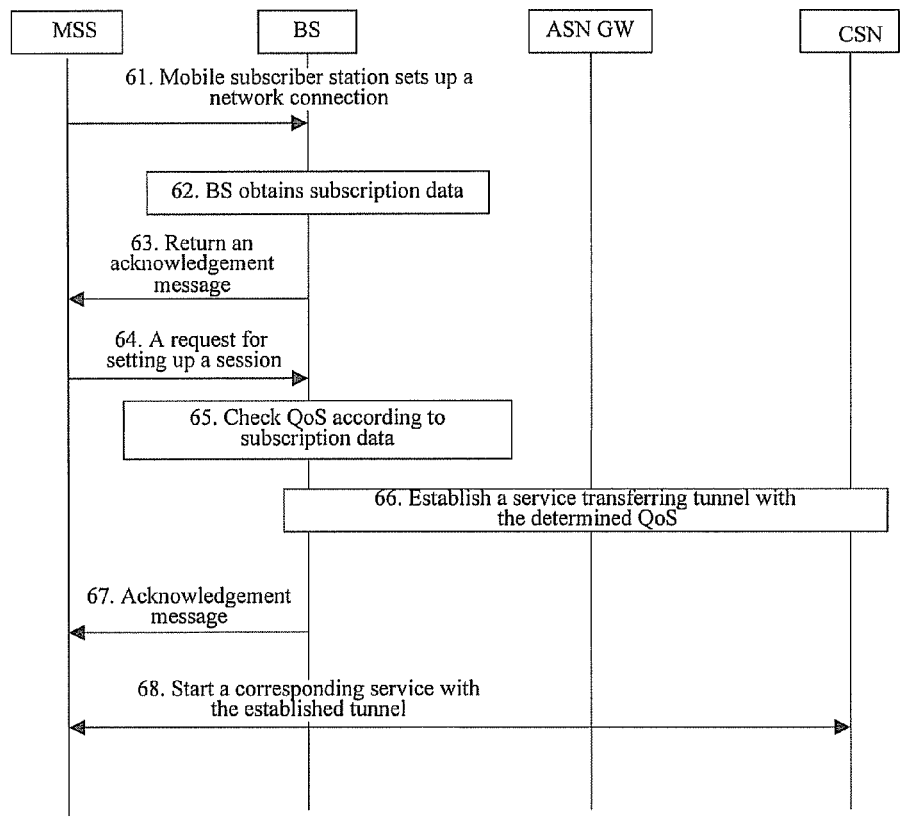
FIG. 6 is a flow chart corresponding to the procedure for a BS obtaining subscription data and controlling negotiation of quality of service parameters according to an embodiment of the present invention.

In another processing procedure, the serving base station (BS) of the mobile subscriber station obtains the subscription data and controls the QoS negotiation. In this processing procedure, the BS performs not only QoS EP but also negotiation controlling DP. As shown in FIG. 6, a specific processing procedure includes the steps as follows.

In step 61, a network connection is set up between the mobile subscriber station (MSS) and the BS.

In step 62, the BS obtains from an AAA server subscription data to be used in QoS negotiation for services.

The subscription data includes a lossless relocation indicator and all the other QoS parameters.

In step 63, the BS returns an acknowledgement message to the mobile subscriber station.

In step 64, the mobile subscriber station sends to the BS a request for setting up a session, with QoS information required for a service carried in the request message. The QoS information consists of all the previously defined parameters, but it is allowable that a part of the parameters are optional.

In step 65, the BS checks the QoS information in the request message according to the subscription data, and determines the QoS parameters that may be provided for the service, including contrasting each of the requested parameters with the subscription data obtained in step 62 to determine whether the parameter is permitted by the subscription data and checking the resources locally on the BS.

In step 66, the BS exchanges information with the ASN GW and the CSN using the determined QoS parameters and sets up a tunnel for transferring the service.

The information exchanging includes negotiating all the previously defined parameters except that the lossless relocation indicator is useless to the ASN GW/CSN and may not be sent to the ASN GW/CSN and the differentiated level parameter needs to be delivered to the ASN GW/CSN.

In step 67, when the tunnel for transferring the service is set up, the BS returns an acknowledgement message to the mobile subscriber station, with QoS parameters that may be provided to the mobile subscriber station carried in the acknowledgement message. The template of the QoS parameters consists of all the previously defined parameters, but it is allowable that a part of the parameters are optional.

In step 68, the mobile subscriber station transfers the service with the set up tunnel and starts the service, and provides a corresponding QoS assurance for the service based on the tunnel.

When a handover or relocation of the mobile subscriber station occurs, the parameters of the MSS negotiated on the old BS are transferred to the new BS. The new BS allocates resources according to the negotiated parameters and responds to a handover/relocation request from the old BS. Then, the new BS requests the AAA server for the whole subscription data (including QoS) for using the subscription data in subsequent QoS negotiation.

When executing the handover or relocation procedure, the old BS will determine whether to forward to the new BS the downlink packets on the user plane which have not yet been delivered to the mobile subscriber station.

The present invention defines end to end MSS-ANS-CSN QoS parameters for WiMax, so that the WiMax may determine whether a user subscribes to lossless relocation through collectively considering network complexity, cross-operator subscription, latency and packet loss rate, user class and the like. The present invention also defines three end to end MSS-ASN-CSN QoS negotiation procedures for WiMax, so that the WiMax system may assure the QoS over the whole end to end MSS-ASN-CSN bearer, thereby providing differentiated services for WiMax users.

A wireless communication system according to an embodiment of the present invention includes network entities for implementing quality of service. The network entities for implementing quality of service negotiate with each other quality of service parameters including a relocation performance indicating parameter, and provide a quality of service assurance corresponding to the negotiated quality of service parameters to a corresponding service flow.

The wireless communication system may be a World Interoperability for Microwave Access (WiMax) system, a Wideband Code Division Multiple Access (WCDMA) system, a Code Division Multiple Access (CDMA) system, a CDMA-2000 system or a Time Division-Synchronous Code Division Multiple Access (TD-SCDMA) system. The wireless communication system is not limited to the above systems but may be a variety of wireless communication systems involving a lossless relocation processing procedure.

In an embodiment of the inventive WiMax system, the network entities for implementing quality of service include an access service network gateway, a serving base station and a connectivity service network.

In the embodiment, the access service network gateway is configured to check quality of service parameters for a service flow according to quality of service parameters carried in a request from a mobile subscriber station for setting up the service, and to control the negotiation and setup of a service transferring tunnel between the serving base station of the mobile subscriber station and the connectivity service network on the basis of the quality of service parameters.

In another embodiment of the inventive WiMax system, the network entities for implementing quality of service include an access service network gateway, a serving base station and a connectivity service network.

In the embodiment, the access service network gateway is configured to check quality of service parameters for a service flow according to subscribed quality of service parameters of the mobile subscriber station, to exchange information with the serving base station of the mobile subscriber station according to the quality of service parameters of the mobile subscriber station to set up a corresponding radio bearer, and to exchange information with the connectivity service network according to the quality of service parameters of the mobile subscriber station to set up a corresponding tunnel.

In another embodiment of the inventive WiMax system, the network entities for implementing quality of service include an access service network gateway, a serving base station and a connectivity service network.

In the embodiment, the access service network gateway is configured to obtain subscribed QoS parameters of the mobile subscriber station in the procedure initiated by the mobile subscriber station for connecting to a network, and send the subscribed quality of service parameters to the serving base station.

The serving base station is configured to check and determine quality of service parameters of the mobile subscriber station for a service flow according to the subscribed quality of service parameters, and negotiate with the connectivity service network and set up a corresponding service transferring tunnel to the connectivity service network according to the checked quality of service parameters.

When a handover or relocation of the mobile subscriber station occurs, the access service network gateway sends the quality of service parameters to a new serving base station of the mobile subscriber station.

In an embodiment of the inventive WiMax system, the network entities for implementing quality of service include a serving base station and a connectivity service network.

The serving base station is configured to obtain subscribed QoS parameters of the mobile subscriber station from the procedure initiated by the mobile subscriber station for connecting to a network, check and determine quality of service parameters of the mobile subscriber station for a service flow according to the subscribed quality of service parameters, and negotiate with the connectivity service network and set up a corresponding service transferring tunnel to the connectivity service network according to the checked quality of service parameters.

The above are preferred embodiments of the present invention. It is not intended to limit the scope of the present invention to these embodiments. Variations and replacements conceivable to those skilled in the art in light of this disclosure should fall into the scope of the present invention. The scope of the present invention intends to be defined by the accompanying claims.

The invention claimed is:

1. A method for providing a quality of service assurance in a wireless communication system, comprising:
    defining lossless relocation indication information in the wireless communication system, wherein the lossless relocation indication information comprises an indicator for indicating a target object of the lossless relocation and a sequence number necessary to be transferred for the lossless relocation, wherein the lossless relocation indication information indicates an approach to achieve lossless relocation and a level of lossless-ness, wherein the lossless relocation indication information is applicable by operators to plan physical connectivity distribution and performance requirement according to move region and a number of users subscribing to the lossless relocation;
    receiving the lossless relocation indication information from an Authentication Authorization Accounting (AAA) server;
    transferring the lossless relocation indication information between entities in the wireless communication system; and
    providing a quality of service equal to or higher than that which is defined by the lossless relocation indication information.

2. The method for providing a quality of service assurance in a wireless communication system according to claim 1, wherein the wireless communication system has a lossless relocation processing procedure and comprises at least a World Interoperability for Microwave Access (WiMax) system, a Wideband Code Division Multiple Access (WCDMA) system, a Code Division Multiple Access (CDMA) system, a CDMA-2000 system and a Time Division-Synchronous Code Division Multiple Access (TD-SCDMA) system.

3. A wireless communication system, comprising an access service network gateway and a base station,
    wherein lossless relocation indication information for lossless relocation is defined in the wireless communication system, the lossless relocation indication information comprises an indicator for indicating a target object of the lossless relocation and a sequence number necessary to be transferred for the lossless relocation, and the lossless relocation indication information indicates an approach to achieve lossless relocation and a level of lossless-ness, wherein the lossless relocation indication information is applicable by operators to plan physical connectivity distribution and performance requirement according to move region and a number of users subscribing to the lossless relocation; and
    wherein the access service network gateway is adapted to receive the lossless relocation indication information from an Authentication Authorization Accounting (AAA) server, and the base station is adapted to provide a quality of service equal to or higher than that which is defined by the lossless relocation indication information.

4. The wireless communication system according to claim 3, wherein the wireless communication system is a World Interoperability for Microwave Access (WiMax) system, a Wideband Code Division Multiple Access (WCDMA) system, a Code Division Multiple Access (CDMA) system, a CDMA-2000 system or a Time Division-Synchronous Code Division Multiple Access (TD-SCDMA) system.

5. A World Interoperability for Microwave Access (WiMax) system, comprising a subscriber, an access service network and a connectivity service network, wherein the access service network comprises an access service network gateway and a base station, wherein lossless relocation indication information for lossless relocation is defined in the WiMax system, the lossless relocation indication information comprises an indicator for indicating a target object of the lossless relocation and a sequence number necessary to be transferred for the lossless relocation, and the lossless relocation indication information indicates an approach to achieve lossless relocation and a level of lossless-ness, wherein the lossless relocation indication information is applicable by operators to plan physical connectivity distribution and performance requirement according to move region and a number of users subscribing to the lossless relocation, and wherein the access service network gateway is adapted to receive the lossless relocation indication information from an Authentication Authorization Accounting server, and the base station is adapted to provide a quality of service equal to or higher than that which is defined by the lossless relocation indication information; when the subscriber accesses the access service network gateway to request for a communication service, quality of service information is obtained; the connectivity service network, the subscriber and the access service network negotiate capability of quality of service, and set up a service bearer according to the obtained quality of service information; and a service flow transmission channel is set up between the connectivity service network and the subscriber via the access service network.

6. The World Interoperability for Microwave Access system according to claim 5, wherein the quality of service information associated with the service contains quality of service information from the connectivity service network or the subscriber.

7. The World Interoperability for Microwave Access system according to claim 5, wherein the access service network gateway or the base station obtains quality of service information subscribed by the subscriber, determines quality of service information for the service flow according to quality of service information in the service request from the subscriber or quality of service information in a response to the service request, capability of the subscriber and capability of the access service network, and notifies the subscriber, the access service network or the connectivity service network of the negotiated quality of service information.

8. The World Interoperability for Microwave Access system according to claim 7, wherein the access service network gateway or the base station is configured to process consistency of quality of service data within the access service network and transfer the quality of service information during a handover.

* * * * *

UNITED STATES PATENT AND TRADEMARK OFFICE
CERTIFICATE OF CORRECTION

PATENT NO. : 8,489,106 B2
APPLICATION NO. : 11/947511
DATED : July 16, 2013
INVENTOR(S) : Yan Zhou It is certified that error appears in the above-identified patent and that said Letters Patent is hereby corrected as shown below:

Title page, item [57] Abstract, lines 2-3 "assurance in a wireless communication"

should read -- assurance in a wireless communication system. --.

Signed and Sealed this
Twelfth Day of November, 2013

Teresa Stanek Rea
*Deputy Director of the United States Patent and Trademark Office*